UNITED STATES PATENT OFFICE.

ELIZA P. LUCAS, OF STARKVILLE, MISSISSIPPI.

SALVE.

SPECIFICATION forming part of Letters Patent No. 284,314, dated September 4, 1883.

Application filed April 5, 1883. (No specimens.)

*To all whom it may concern:*

Be it known that I, ELIZA P. LUCAS, a citizen of the United States, residing in the town of Starkville, in the county of Oktibbeha and State of Mississippi, have invented a new and useful composition of matter or salve to be used for the relief of coughs, colds, rheumatism, neuralgia, sore eyes, mumps, diphtheria, raised breasts, whooping-cough, measles, tumors, &c., of which the following is a specification.

My composition consists of the following ingredients, combined in the proportions stated—viz., water, one-half pint; hogs' lard, one and one-half pound; mutton suet, one-half pound; saltpeter, one ounce; borax, one ounce; alum, one ounce; oil of sassafras, one-half gill; sal-soda, three ounces; turpentine, one gill. These ingredients are to be thoroughly mixed by boiling the water, lard, suet, saltpeter, borax, alum, and oil of sassafras until the water has all evaporated. Set off the fire, add the soda and turpentine, strain off, put in boxes to harden.

In using this salve the parts affected should be thoroughly rubbed.

I am not aware that all the ingredients of my salve have ever been used together.

What I claim, and desire to secure by Letters Patent of the United States, is—

The herein-described composition of matter, or salve, consisting of water, lard, suet, borax, alum, saltpeter, sal-soda, oil of sassafras, and turpentine, in the proportions specified.

ELIZA P. LUCAS.

Witnesses:
JAMES LONGSTREET,
MARY L. JARNAGIN.